(No Model.)
W. F. DRAPER.
BOBBIN SUPPORTER FOR SPOOLING MACHINES.
No. 315,488. Patented Apr. 14, 1885.
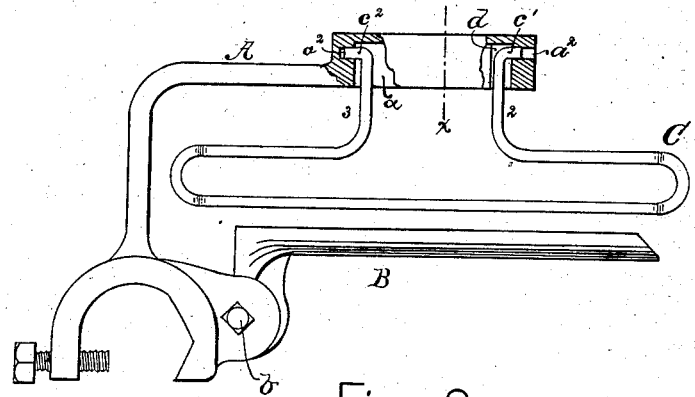
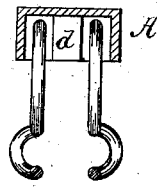
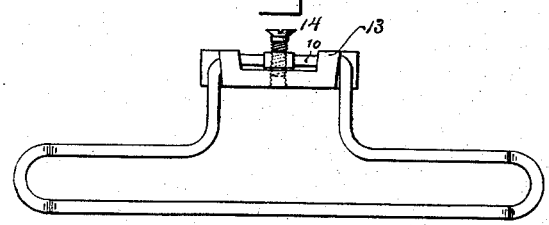
Witnesses.
Henry Marsh.
Arthur Lippitten
Inventor
William F. Draper.
by Crosby Gregory
attys.

UNITED STATES PATENT OFFICE.

WILLIAM F. DRAPER, OF HOPEDALE, MASSACHUSETTS.

BOBBIN-SUPPORTER FOR SPOOLING-MACHINES.

SPECIFICATION forming part of Letters Patent No. 315,488, dated April 14, 1885.

Application filed March 3, 1884. (No model.)

*To all whom it may concern:*

Be it known that I, WILLIAM F. DRAPER, of Hopedale, county of Worcester, State of Massachusetts, have invented an Improvement in Bobbin-Supporters for Spooling-Machines, of which the following description, in connection with the accompanying drawings, is a specification, like letters on the drawings representing like parts.

My invention is an improvement on the class of bobbin-supporters represented in United States Patent No. 245,677, August 16, 1881. In such class of bobbin-holders as practically made the gravitating arms have been composed of wire, the ends of which, connected together, have been placed in a socket of the overhanging head of the supporter, and the said arms have been held in the said socket by a cap-plate attached to the overhanging head by a screw.

The object of my invention is to do away with the said metal cap and screw, thus not only reducing the weight of the supporter, but also cheapening its construction, and at the same time I have made the gravitating arms as springs, so that they may be readily placed in position in the socket of the head, or be removed from the said socket when desired, a stop placed between the two arms serving to prevent either arm from engaging or catching the other, so as not to operate properly.

Figure 1 in side elevation represents a bobbin-supporter containing my improvements, the overhanging head being partially broken out to show the recesses into which the pivotal ends of the spring-like gravitating arms rest. Fig. 2 is a section of Fig. 1 on the dotted line $x\,x$, looking toward the right; and Fig. 3 represents one of the gravitating arms such as now commonly made and used, together with the cap to hold the same in place in the socket of the arm and a screw to secure the cap to the arm.

The overhanging arm A, socketed at $a$, and the trough or rest B for the bobbin, connected therewith by the bolt $b$, are all as usual. The gravitating arms C are each composed of wire, the two ends of which are bent, substantially as shown, to form pivotal ends or lugs $c'\,c^2$, which, when the parts 2 3 of the said arm are forced toward each other, the pivotal ends $c'$ $c^2$, having been placed in the socket $a$, opposite the recesses $a^2\,a^3$, may be caught into the said recesses by merely releasing the parts 2 3, and the said arms caught in position, as represented by one of the said arms in Fig. 1, will be securely but removably held in the said socket of the head A. A stop, $d$, placed between the arms C, and shown as an integral part of the overhanging head A, prevents the lower edges of the arms from approaching each other sufficiently to catch one upon the other. Fig. 3 shows the arm commonly used. Two such arms are acted upon at their portions 10 by a cap, 13, held in place in the socket $a$ by a suitable screw, 14, extended through a hole of the cap and into a suitable hole in the socket.

In the older form of device shown in Fig. 3 the stops to prevent the two arms approaching each other too closely are formed as parts of the cap.

I claim—

The gravitating springy arms provided with free ends or lugs $c'\,c^2$, and the overhanging head A, provided with recesses to receive the said free ends or lugs of the arms, and with the stop located between the arms to prevent one arm from engaging or catching the other, combined with a trough or bobbin-rest, to operate substantially as described.

In testimony whereof I have signed my name to this specification in the presence of two subscribing witnesses.

WM. F. DRAPER.

Witnesses:
G. W. GREGORY,
W. H. SIGSTON.